United States Patent
Ishii et al.

(10) Patent No.: US 10,377,277 B2
(45) Date of Patent: Aug. 13, 2019

(54) VEHICLE SEAT, AND VEHICLE-SEAT PRODUCTION METHOD

(71) Applicant: TACHI-S CO., LTD., Tokyo (JP)

(72) Inventors: Atsushi Ishii, Tokyo (JP); Shinichi Mizuno, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 169 days.

(21) Appl. No.: 15/539,584

(22) PCT Filed: Nov. 17, 2015

(86) PCT No.: PCT/JP2015/082301
§ 371 (c)(1),
(2) Date: Jun. 23, 2017

(87) PCT Pub. No.: WO2016/103986
PCT Pub. Date: Jun. 30, 2016

(65) Prior Publication Data
US 2017/0361745 A1 Dec. 21, 2017

(30) Foreign Application Priority Data

Dec. 25, 2014 (JP) .................... 2014-262286

(51) Int. Cl.
*B60N 2/58* (2006.01)
*B68G 7/00* (2006.01)

(52) U.S. Cl.
CPC .......... *B60N 2/5875* (2013.01); *B60N 2/58* (2013.01); *B60N 2/5891* (2013.01); *B68G 7/00* (2013.01)

(58) Field of Classification Search
CPC ...... B60N 2/5875; B60N 2/58; B60N 2/5891; B68G 7/00

(Continued)

(56) References Cited

U.S. PATENT DOCUMENTS 3,298,045 A * 1/1967 Anderson .............. A47C 7/185
297/219.1
3,647,260 A * 3/1972 Grant .................... A47C 7/185
297/229

(Continued)

FOREIGN PATENT DOCUMENTS

JP 64-40312 A 2/1989
JP 4-163139 A 6/1992

(Continued)

OTHER PUBLICATIONS

International Search Report for PCT/JP2015/082301 dated Feb. 23, 2016; English translation submitted herewith (5 pages).

(Continued)

*Primary Examiner* — Jose V Chen
(74) *Attorney, Agent, or Firm* — Fitch, Even, Tabin & Flannery, L.L.P.

(57) ABSTRACT

The present invention provides a vehicle seat with little fine creases on a concave portion of a seat surface even the use of natural leather such as a cowhide as a skin material for the vehicle seat. A vehicle seat includes a seat cushion making a seated portion of the seat; a seat back disposed at a back side of the seat cushion and making a backrest portion of the seat; and a cover formed of a cloth including a skin material, an adhesive material, and a cushion material at a concave portion on at least one surface among the seat cushion and the seat back. The cover is formed into a concave shape by heat presswork with a mold having a curved surface.

12 Claims, 7 Drawing Sheets

(58) Field of Classification Search
USPC .................................... 297/228.1, 219.11
See application file for complete search history.

(56) References Cited

U.S. PATENT DOCUMENTS

| | | | | | |
|---|---|---|---|---|---|
| 4,378,396 | A | * | 3/1983 | Urai | A47C 27/146 428/198 |
| 4,679,851 | A | * | 7/1987 | Solie | A47C 31/026 297/218.2 |
| 5,058,955 | A | * | 10/1991 | Sugiura | B29C 44/143 297/452.61 |
| 5,333,933 | A | * | 8/1994 | Urai | D05B 39/00 297/219.1 |
| 5,654,069 | A | * | 8/1997 | Matsuoka | A47C 7/18 297/228.13 |
| 5,702,159 | A | * | 12/1997 | Matsuoka | A47C 7/18 297/218.2 |
| 6,840,566 | B2 | * | 1/2005 | Bruton | B60N 2/783 296/153 |
| 7,416,250 | B1 | * | 8/2008 | DiFilippo | B62J 1/12 297/219.1 |
| 7,823,980 | B2 | * | 11/2010 | Niwa | B60N 2/5891 297/218.2 |
| 7,837,263 | B2 | * | 11/2010 | Booth | A47C 7/20 297/218.1 |
| 9,751,580 | B2 | * | 9/2017 | Bigolin | B62J 1/002 |
| 2006/0075615 | A1 | * | 4/2006 | Khambete | A47C 27/12 29/91.1 |
| 2006/0232111 | A1 | * | 10/2006 | Hasegawa | B29C 33/3814 297/219.11 |
| 2012/0208418 | A1 | * | 8/2012 | Yea | B32B 5/026 442/306 |

FOREIGN PATENT DOCUMENTS

| | | |
|---|---|---|
| JP | 6-285277 A | 10/1994 |
| JP | 7-2024 U | 1/1995 |
| JP | 7-16492 Y2 | 4/1995 |
| JP | 8-66571 A | 3/1996 |

OTHER PUBLICATIONS

English language machine translation of JP H06-285277 to Suga et al.

* cited by examiner

VAPOR

HEATED

VEHICLE SEAT, AND VEHICLE-SEAT PRODUCTION METHOD

CROSS-REFERENCE TO RELATED APPLICATIONS

This application is a U.S. national phase application filed under 35 U.S.C. § 371 of International Application No. PCT/JP2015/082301, filed Nov. 17, 2015, designating the United States, which claims priority from Japanese Patent Application No. 2014-262286, filed Dec. 25, 2014, which are hereby incorporated herein by reference in their entirety.

TECHNICAL FIELD

The present invention relates to a vehicle seat and a production method of the same.

BACKGROUND ART

A vehicle seat such as an automobile seat, is subjected to many requests for improvement in comfort of a passenger such as comfortness to sit on and vibration absorbing performance as well as requests for various functions such as safety, holdability, and getting in/out efficiency (ease of getting in and out). The vehicle seat is a large component among vehicle interior components and therefore there are various requests for the appearance and the design.

In designing diversified automobile seats, formation of a wide variety of concavo-convex shapes, a curved surface, and a curved line on a seat surface is necessary. A development of a seat cover achieving the formation is a focal objective.

As a background technique in this technical field, there has been provided a technique such as Patent Literature 1. Patent Literature 1 discloses "In a vehicle interior component where a skin layer is integrally stuck on a front surface side of a core material made of a composite resin, an open-cell foam material is laminated on a back surface of a skin material of the skin layer. During a press molding of the core material made of the composite resin, the skin layer is integrally pressed to the front surface side of this core material."

With the vehicle interior component, the core material and the skin layer are integrated, thereby ensuring easily producing the vehicle interior component with a desired curved surface. Additionally, even if the open cell foam material used as a pad material becomes flat during the molding due to pressurizing force of the molding, since the foam material has a desired thickness after the molding by restorability that the foam material has, the foam material does not lose a feeling of soft of the product. Thus, a satisfactory shock-absorbing property is obtained.

Patent Literature 2 discloses a mold for press molding. "With the mold for press molding where a skin material whose peripheral edges are set on set pins on an upper die for press molding being integrated with a resin core material supplied into upper and lower dies for press molding so as to be a predetermined shape through the press molding, edge portions are formed on outer surfaces of the set pins to cut the skin material by the edge portions of the set pins when a predetermined tension is applied to the skin material during the press molding."

The mold for press molding enhances formability in the mold for press molding that press-molds the resin core material with the skin material integrally and reliably prevents, for example, creases and a cut on the skin material. Thus, a degree of freedom of shaping of a product can be expanded.

CITATION LIST

Patent Literature

PTL 1: JP-UM-B-7-16492
PTL 2: JP-UM-A-7-2024

SUMMARY OF INVENTION

Technical Problem

As described above, in response to the design of the diversified automobile seats, the wide variety of the concavo-convex shapes, the curved surface, and the curved line needs to be formed on the seat surface for the vehicle seat such as the automobile seat.

Meanwhile, to provide a sense of luxury to the seat, a natural leather material such as a cowhide, which is referred to as so-called real leather, is often used as the skin material of the seat cover. In particular, since the cowhide on a back of a cow is less likely to stretch compared with the cowhide on the belly side and is less likely to produce creases on the surface even processed into various shapes, the cowhide is more appropriate as the skin material of the seat.

However, with the use of the cowhide as the skin material for the seat, in the case where a concave shape (hollow), which is referred to as an inverse shape, is attempted to be formed, fine creases referred to as tiny creases or grain creases are generated even on the surface of the cowhide of the back.

In general, as the seat cover for automobile seat, a lamination cloth (trim complex) where a cushion material referred to as wadding is bonded to the skin material with an adhesive material is used. When the inverse shape (concave shape) is attempted to be formed using the lamination cloth formed by boning the plurality of materials with different stretch, the tiny creases or the grain creases are generated on the surface of the cowhide as the skin material due to the difference in stretch.

Patent Literature 1 relates to the feeling of soft and the shock-absorbing property of the vehicle interior component produced by integrally performing presswork on a cloth formed by integrally sticking the skin layer to the core material made of composite resin. Patent Literature 1 mentions neither tiny creases nor grain creases of natural leather and therefore cannot solve the above-described problems.

Patent Literature 2 relates to large creases generated on the skin material when press forming is integrally performed on the resin core material and the skin material. Similar to Patent Literature 1, Patent Literature 2 mentions neither the tiny creases nor the grain creases of the natural leather and therefore cannot solve the above-described problems.

Therefore, an object of the present invention is to provide a vehicle seat with little fine creases on a concave portion of a seat surface even the use of natural leather such as a cowhide as the skin material for the vehicle seat.

Another object of the present invention is to achieve a vehicle-seat production method by which fine creases are less likely to occur on the concave portion of the seat surface even the use of the natural leather such as the cowhide as the skin material.

Solution to Problem

The present invention is a vehicle seat to solve the above-described problems that includes a seat cushion, a seat back, and a cover. The seat cushion makes a seated portion of the seat. The seat back is disposed at a back side of the seat cushion. The seat back makes a backrest portion of the seat. The cover is formed of a cloth including a skin material, an adhesive material, and a cushion material at a concave portion on at least one surface among the seat cushion and the seat back. The cover is formed into a concave shape by heat presswork with a mold having a curved surface.

The present invention is a vehicle seat that includes a seat cushion, a seat back, and a cover. The seat cushion makes a seated portion of the seat. The seat back is disposed at a back side of the seat cushion. The seat back makes a backrest portion of the seat. The cover is formed of a cloth including a skin material, a cushion material, an adhesive material, and an interlining at a concave portion on at least one surface among the seat cushion and the seat back. The cover is formed into a concave shape by heat presswork with a mold having a curved surface.

The present invention is a vehicle-seat production method that includes (a) a step of at least stacking three layers of a skin material, an adhesive material, and a cushion material to produce a lamination cloth; and (b) step of performing presswork with a mold having a curved surface on a press surface while heating the lamination cloth to form a concave portion.

The present invention is a vehicle-seat production method that includes (a) a step of at least stacking four layers of a skin material, a cushion material, an adhesive material, and an interlining to produce a lamination cloth; and (b) a step of performing presswork with a mold having a curved surface on a press surface while heating the lamination cloth to form a concave portion.

Advantageous Effects of Invention

The present invention can achieve a vehicle seat with little fine creases on a concave portion of a seat surface even the use of natural leather such as a cowhide as a skin material for a vehicle seat.

The present invention can achieve a vehicle-seat production method by which fine creases are less likely to occur on the concave portion of the seat surface even the use of the natural leather such as the cowhide as the skin material.

Problems, configurations, and effects other than ones described above will be made apparent from the following description of embodiments.

DESCRIPTION OF EMBODIMENTS

The following describes embodiments of the present invention with reference to the drawings.

Embodiment 1

Figure 11:
FIG. 11 is a drawing illustrating a partial cross-sectional surface of a general seat cover.
Figure 12:
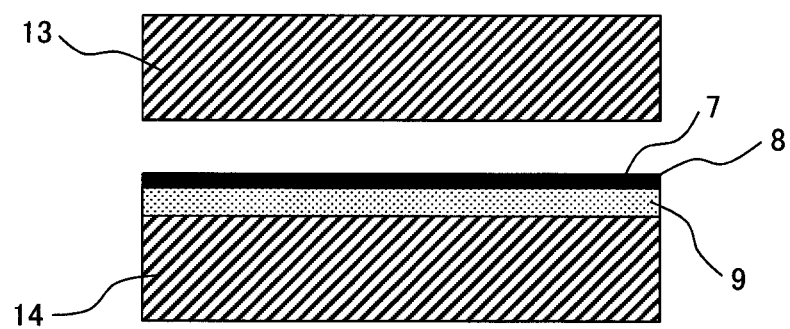
FIG. 12 is a drawing illustrating a part of a production step of the general seat cover.

First, the following describes a part of a production step for general seat cover of a vehicle seat such as an automobile seat with reference to FIG. 11 and FIG. 12. FIG. 11 illustrates a partial cross-sectional surface of the seat cover. FIG. 12 illustrates a partial cross-sectional surface in the production step for the seat cover.

As illustrated in FIG. 11, the general seat cover is formed of a lamination cloth where a skin material 7 and a wadding 9, which is a cushion material, are bonded with an adhesive material 8. As this adhesive material 8, a sheet-shaped adhesive material referred to as, what is called hot-melt adhesive material, is often used. The hot-melt adhesive material is a solid adhesive material at ordinary temperature used by heated to be melted by heat around 80° C. to 100° C. for application and is fixedly secured through cooling. A material of the hot-melt adhesive material is, for example, a thermoplastic plastic such as a polyamide and an ethylene vinyl acetate.

As illustrated in FIG. 12, the production step for the general seat cover performs presswork by a pressing machine while materials of the three layers, the skin material 7, the adhesive material 8, and the wadding 9 as illustrated in FIG. 11, are heated to form the lamination cloth. Conventionally, this pressing machine uses a lower die 14 of a flat pressing machine same as an upper die 13 of the flat pressing machine to form a planate cloth.

To use this planate lamination cloth as the seat cover for automobile seat, as described above, if a concave surface for use as a concave portion of the seat is attempted to be formed, fine creases referred to as tiny creases or grain creases are generated on a surface of the skin material 7. In particular the use of natural leather such as a cowhide as the material of the skin material 7 remarkably generates the tiny creases or the grain creases. These tiny creases or grain creases formed on the surface of the skin material 7 deteriorate appearance of the seat.

Figure 1:
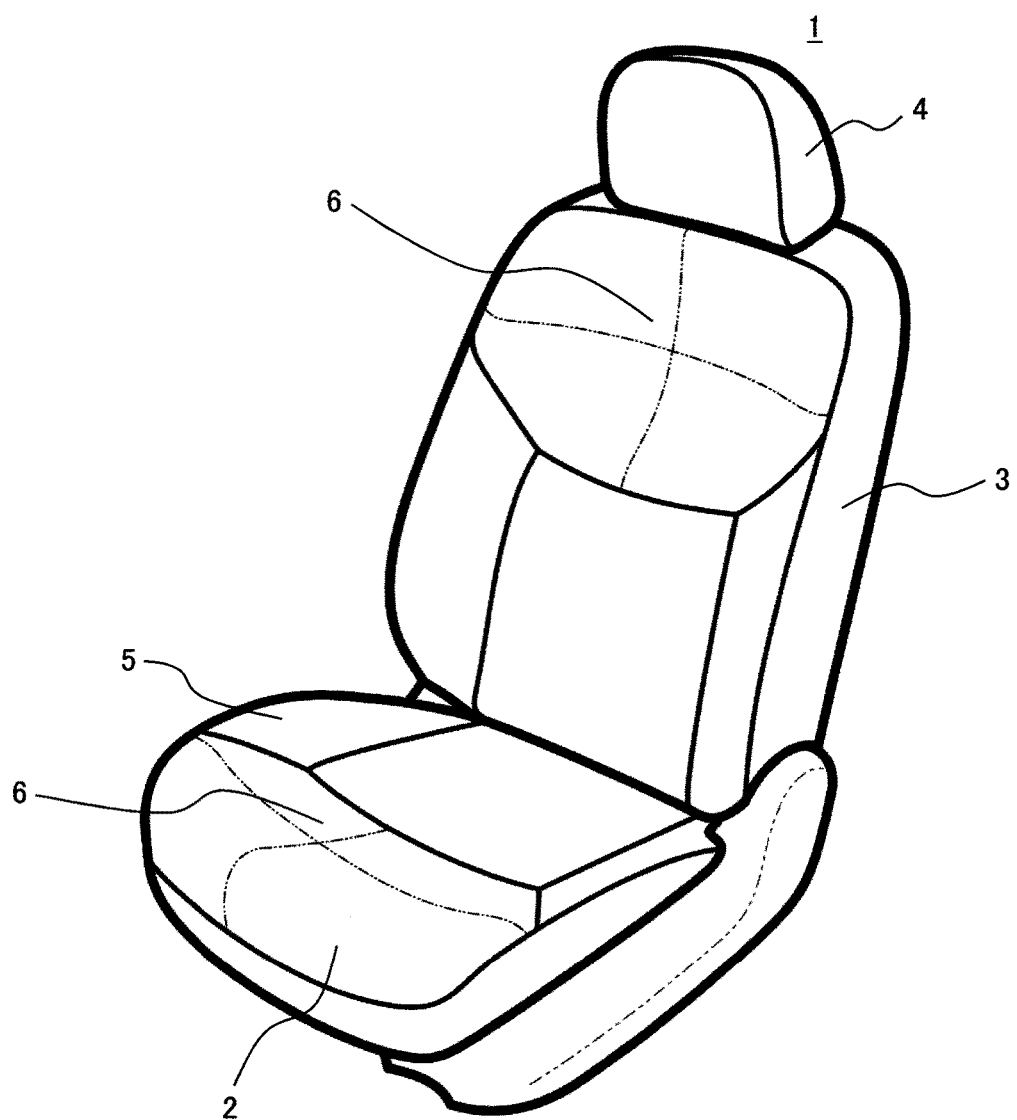
FIG. 1 is a drawing illustrating a whole outline of a vehicle seat according to one embodiment of the present invention.

The following describes a whole outline of the vehicle seat such as the automobile seat, which is the one embodiment of the present invention, with reference to FIG. 1. As illustrated in FIG. 1, a vehicle seat 1 according to an embodiment 1 includes, for example, a seat cushion 2, which makes a seated portion of the seat, a seat back 3 which is disposed on a back side of the seat cushion 2 and makes a backrest portion of the seat, and a head rest 4, which protects a head and a neck region of a passenger, as main parts. Side supports 5, which are disposed on both sides of the seat cushion 2, serve as a support of side parts of the seated portion.

Concave portions (hollows) 6 are three-dimensionally disposed on a part of surfaces of the seat cushion 2 and the seat back 3 of the vehicle seat 1. The above-described tiny creases or grain creases only rarely occur on the surfaces of these concave portions (hollows) 6.

Figure 2:
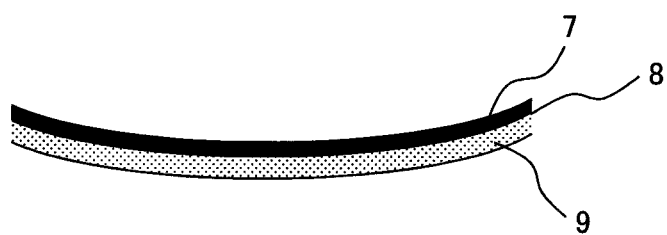
FIG. 2 is a drawing illustrating a partial cross-sectional surface of a seat cover according to the one embodiment of the present invention.

FIG. 2 illustrates a partial cross-sectional surface of the part of the above-described concave portion (hollow) 6 of the seat cover. As illustrated in FIG. 2, the cloth of the part of the concave portion (hollow) 6 of the seat cover in FIG. 1 is formed into a concave shape. Similar to FIG. 11, this cloth is the lamination cloth produced by the presswork on the materials of the three layers, the skin material 7, the adhesive material 8, and the wadding 9 by the pressing machine while the materials are heated. However, this cloth is preliminary formed into the concave shape, which is the difference from the planate cloth in FIG. 11.

Figure 3:
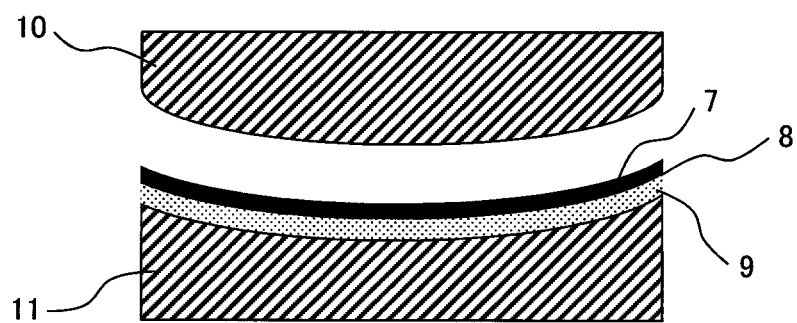
FIG. 3 is a drawing illustrating a part of a production step of the seat cover according to the one embodiment of the present invention.

As illustrated in FIG. 3, this concave lamination cloth can be formed by the presswork while the materials of the three layers, the skin material 7, the adhesive material 8, and the wadding 9, are heated with an upper die 10 of a convex pressing machine and a lower die 11 of a concave pressing machine.

Here, for example, a urethane wadding with a urethane as the material is used for the wadding 9. The use of a high-density wadding with the density of around 20 g/dm$^3$ to 50 g/dm$^3$ for this urethane wadding is more preferable. This improves cushioning characteristics of the seat and is effective to reduce the tiny creases or the grain creases on the surface of the concave portion (hollow) of the seat.

Figure 4:
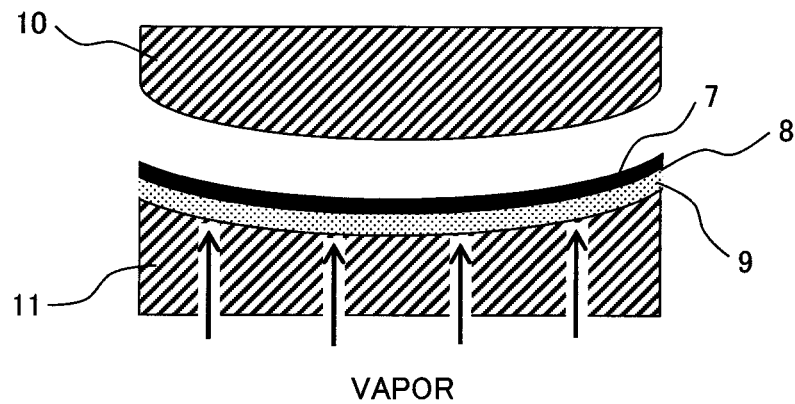
FIG. 4 is a drawing illustrating a part of the production step of the seat cover according to the one embodiment of the present invention.
Figure 5:
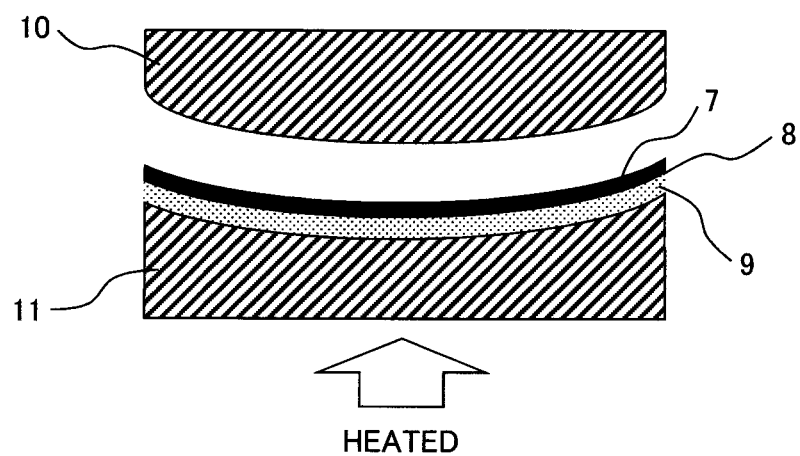
FIG. 5 is a drawing illustrating a part of the production step of the seat cover according to the one embodiment of the present invention.

FIG. 4 and FIG. 5 illustrate examples of the presswork on the lamination cloth while the heating is performed. In FIG. 4, the lower die 11 of the concave pressing machine has a plurality of through-holes. Vapor around 100° C. is supplied through the through-holes to heat the lamination cloth from the wadding 9 side. Performing the presswork with the upper die 10 of the pressing machine and the lower die 11 of the pressing machine while the lamination cloth is heated with the vapor melts the adhesive material 8 and bonds the skin material 7 and the wadding 9 together.

In FIG. 5, an electric heater is provided at the lower die 11 of the pressing machine for direct heating of the lamination cloth from the wadding 9 side. While the lamination cloth is directly heated with the heated lower die 11 of the pressing machine, the presswork is performed with the upper die 10 of the pressing machine and the lower die 11 of the pressing machine. This melts the adhesive material 8 and bonds the skin material 7 and the wadding 9 together. Needless to say, it is obvious that the case where the heat source is provided at the upper portion, namely, the upper die 10 of the pressing machine does not make a difference from the above-described embodiment in steps and completed product.

Figure 6:
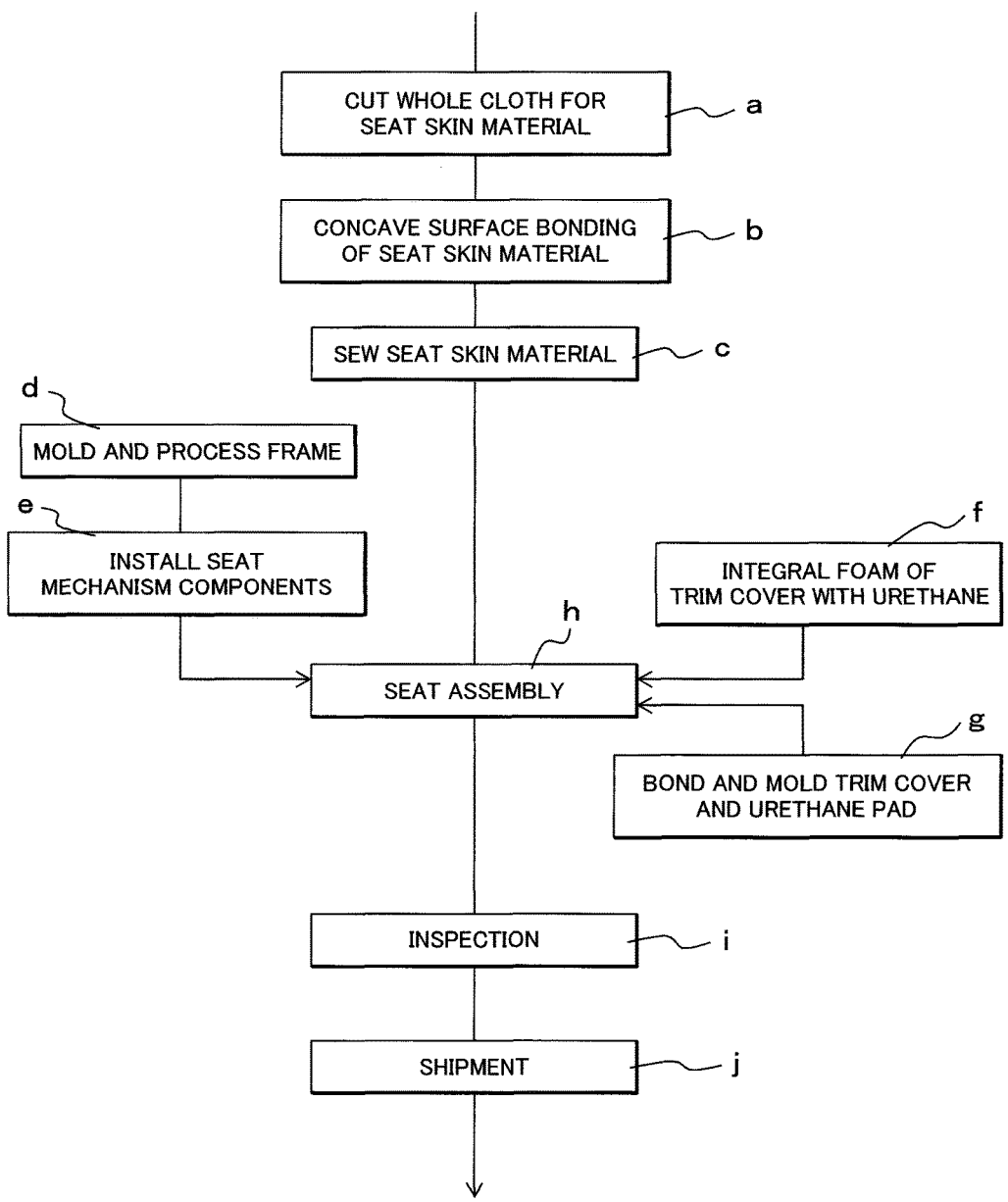
FIG. 6 is a flowchart showing an outline of the production step of the vehicle seat according to the one embodiment of the present invention.
Figure 7:
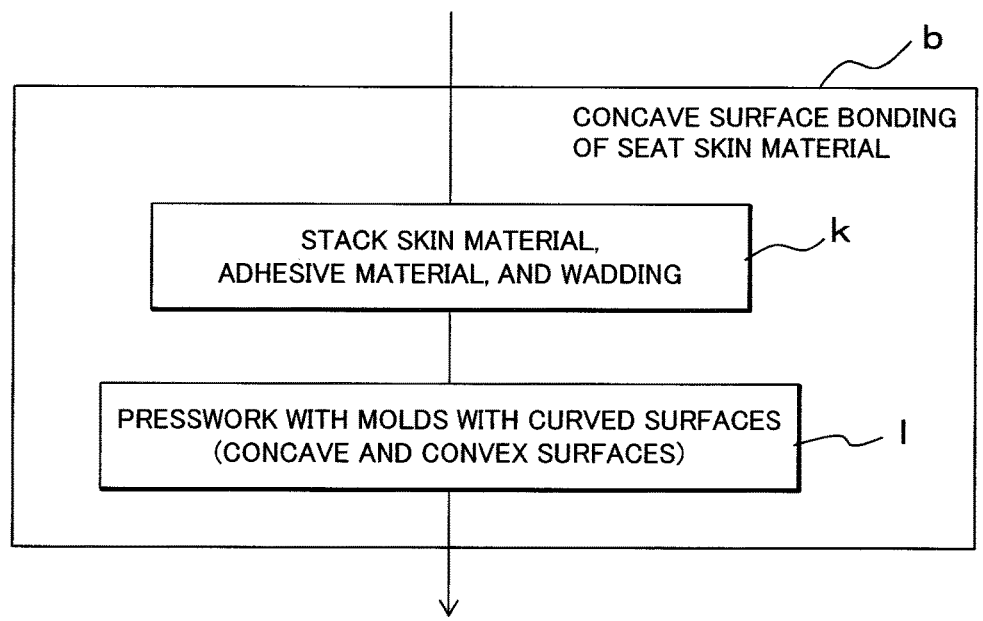
FIG. 7 is a flowchart showing a part of the production step of the seat cover according to the one embodiment of the present invention.

The following describes a vehicle-seat production method according to this embodiment with reference to FIG. 6 and FIG. 7. FIG. 6 shows an outline of the production step of the vehicle seat according to this embodiment.

First, at Step a, a whole cloth for the seat skin material is cut. Next, at Step b, the concave surface of the seat skin material is bonded by the method illustrated in FIG. 4 or FIG. 5. This Step b, as described above, is a step to perform the presswork by the pressing machine while the materials of the three layers, the skin material 7, the adhesive material 8, and the wadding 9, are heated.

Subsequently, each piece of the seat skin material is sewed (Step c). In another line, a frame of the seat is formed by molding and processing of a metallic material or a similar material (Step d). Then, seat mechanism components such as a reclining adjuster and a seat lever are installed. (Step e).

In yet another line, processes such as an integral foam of a trim cover with the urethane (Step f) and bonding and molding of the trim cover and a urethane pad (Step g) are performed.

As shown in FIG. 6, the respective portions of the seat formed at the respective steps are assembled as the seat at a seat assembly step (Step h). Afterwards, through inspection (Step i), the seat is shipped to an automobile manufacturer or a similar manufacturer (Step j).

FIG. 7 illustrates a breakdown of steps of the above-described concave surface bonding step (Step b) for the seat skin material. The skin material 6, the adhesive material 8, and the wadding 9, which makes the cushion material, are stacked into the three layers to form the lamination cloth (Step k). Next, the presswork is performed on this lamination cloth by the method illustrated in FIG. 4 or FIG. 5 to process the cloth into the concave shape (Step l).

As described above, the vehicle seat of the embodiment and the production method can produce and provide the vehicle seat with little fine creases such as the tiny creases or the grain creases on the concave portion of the seat surface even the use of the natural leather (real leather) like the cowhide as the skin material.

The formation of the cloth of the seat cover for the concave portion (hollow) of the seat into the concave shape in advance eliminates the need for processing the seat cover into the concave shape at the seat assembly step, thereby improving work efficiency.

Embodiment 2

Figure 8:
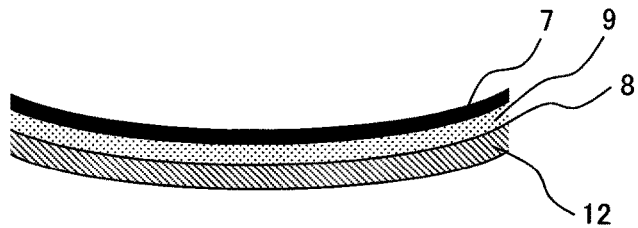
FIG. 8 is a drawing illustrating a partial cross-sectional surface of a seat cover according to one embodiment of the present invention.
Figure 9:
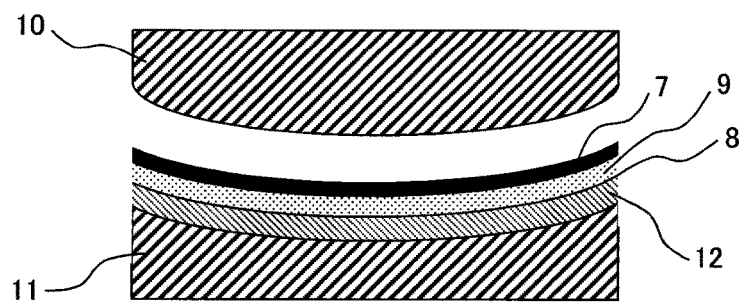
FIG. 9 is a drawing illustrating a part of a production step of the seat cover according to the one embodiment of the present invention.

The following describes a vehicle seat such as an automobile seat as another embodiment of the present invention with reference to FIG. 8 and FIG. 9. FIG. 8 illustrates a partial cross-sectional surface of the part of the concave portion (hollow) 6 of the seat cover of the vehicle seat 1 illustrated in FIG. 1. As illustrated in FIG. 8, the seat cover according to this embodiment uses the lamination cloth formed by the presswork by the pressing machine while materials of four layers of the skin material 7, the wadding 9, which makes the cushion material, the adhesive material 8, and an interlining 12, which makes a shape-holding material, are heated.

The lamination cloth illustrated in FIG. 8, similar to the cloth illustrated in FIG. 2, is preliminary formed into the concave shape by the use of molds having curved surfaces (concave and convex surfaces) on press surfaces. The use of the cloth in FIG. 8 to the concave portion (hollow) 6 of the vehicle seat 1 in FIG. 1 allows forming the three-dimensional concave portion. The use of the cloth on which the concave shape is preliminary formed allows preventing the tiny creases or the grain creases on the surface of the skin material 7. Furthermore, the formation with the cloth including the interlining 12, which is the shape-holding material, ensures forming the concave shape with more certainty and holding the concave shape.

As the interlining 12, which is the shape-holding material, a fabric and a knit with, for example, a cotton, a polyester, a rayon, a nylon, and a polypropylene as the material; or a nonwoven with, for example, a polyester, a rayon, a nylon, an acrylic, and a polypropylene as the material is used.

As illustrated in FIG. 9, the concave lamination cloth is formed by the presswork while materials of the four layers, the skin material 7, the wadding 9, the adhesive material 8, and the interlining 12, are heated with the upper die 10 of the convex pressing machine and the lower die 11 of the concave pressing machine.

Figure 10:
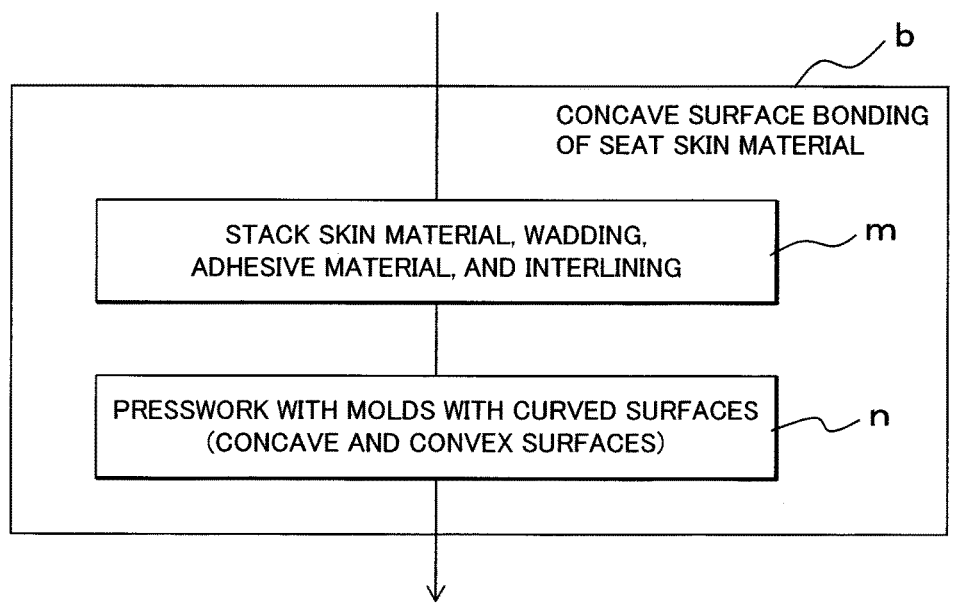
FIG. 10 is a flowchart showing a part of the production step of the seat cover according to the one embodiment of the present invention.

FIG. 10 shows a part of steps of the vehicle-seat production method according to this embodiment. FIG. 10 shows a breakdown of Step b, which is described in FIG. 6 as the embodiment 1. The skin material 7, the wadding 9, the adhesive material 8, and the interlining 12 are stacked into the four layers to form the lamination cloth (Step m). Next, the presswork is performed on this lamination cloth by the method illustrated in FIG. 4 or FIG. 5 to process the cloth into the concave shape (Step n).

As described above, the vehicle seat of the embodiment and the production method can produce and provide the vehicle seat with little fine creases soon as the tiny creases or the grain creases on the concave portion of the seat surface even the use of the natural leather (real leather) like the cowhide as the skin material.

The present invention is also applicable to formation of a peripheral part of a belt buckle at the seat surface into a concave shape.

The formation of the cloth of the seat cover for the concave portion (hollow) portion of the seat into the concave shape in advance eliminates the need for processing the seat cover into the concave shape at the seat assembly step, thereby improving the work efficiency.

The use of the cloth including the interlining 12, which is the shape-holding material, to the part forming the concave portion (hollow) of the seat ensures holding the concave shape of the seat for a long period.

The present invention is not limited to the above-described embodiments, and includes various modifications. For example, the above-described embodiments are described in detail for simply describing the present invention, and do not necessarily include all the described configurations. A part of the configurations of one embodiment can be replaced by the configuration of another embodiment. A part of the configurations of one embodiment can be used with the addition of the configuration of another embodiment. Regarding a part of the configurations in the respective embodiments, another configuration can be added, deleted, or replaced.

REFERENCE SIGNS LIST 1 vehicle seat,
2 seat cushion,
3 seat back,
4 head rest,
5 side support,
6 concave portion (hollow),
7 skin material (real leather),
8 adhesive material,
9 wadding,
10 upper die of pressing machine (convex die),
11 lower die of pressing machine (concave die),
12 interlining.
13 upper die of pressing machine (flat die),
14 lower die of pressing machine (flat die).

The invention claimed is:

1. A vehicle seat comprising:
   a seat cushion making a seated portion of the seat;
   a seat back disposed at a back side of the seat cushion, the seat back making a backrest portion of the seat; and
   a cover formed of a cloth comprising four layers including a skin material, an adhesive material, a wadding forming a cushion material, and an interlining forming a shape-holding material at a concave portion on at least one surface among the seat cushion and the seat back, wherein
   the cover is formed into a concave shape by heat presswork with a mold having a curved surface, and
   the wadding comprises a high-density urethane having a density of 20 g/dm$^3$ or more and 50 g/dm$^3$ or less.

2. The vehicle seat according to claim 1,
   wherein the skin material is a real leather with a natural leather as a material.

3. The vehicle seat according to claim 2,
   wherein the natural leather is a cowhide.

4. The vehicle seat according to claim 1, wherein the adhesive material is a hot-melt-based adhesive material heated and melted for bonding.

5. A vehicle-seat production method comprising:
   (a) a step of at least stacking three layers including a skin material, an adhesive material, and a cushion material to produce a lamination cloth; and
   (b) a step of performing presswork with a mold having a curved surface on a press surface while heating the lamination cloth to form a concave portion, wherein the lamination cloth is heated from the cushion material side by supplying vapor at around 100° C. through a plurality of through-holes provided in a lower die of the mold.

6. The vehicle-seat production method according to claim 5,
   wherein the skin material is a real leather with a natural leather as a material.

7. The vehicle-seat production method according to claim 6,
   wherein the natural leather is a cowhide.

8. The vehicle-seat production method according to claim 5, wherein
   the adhesive material is a hot-melt-based adhesive material heated and melted for bonding.

9. A vehicle-seat production method comprising:
   (a) a step of at least stacking four layers including a skin material, a cushion material, an adhesive material, and an interlining to produce a lamination cloth; and
   (b) a step of performing presswork with a mold having a curved surface on a press surface while heating the lamination cloth to form a concave portion, wherein the lamination cloth is heated from the cushion material side by supplying vapor at around 100° C. through a plurality of through-holes provided in a lower die of the mold.

10. The vehicle-seat production method according to claim 9,
    wherein the skin material is a real leather with a natural leather as a material.

11. The vehicle-seat production method according to claim 9, wherein
    the adhesive material is a hot-melt-based adhesive material heated and melted for bonding.

12. The vehicle-seat production method according to claim 10,
    wherein the natural leather is a cowhide.

* * * * *